United States Patent Office 3,522,335
Patented July 28, 1970

3,522,335
METHODS FOR PRODUCING REVERSE OSMOSIS MEMBRANE AND THE COMPOSITION UTILIZED
Martin E. Rowley, Rochester, N.Y., assignor to Eastman Kodak Company, New York, N.Y., a corporation of New Jersey
No Drawing. Filed Feb. 29, 1968, Ser. No. 709,226
Int. Cl. B29d *27/04;* C08b *21/04, 27/52*
U.S. Cl. 264—49                                     27 Claims

ABSTRACT OF THE DISCLOSURE

Processes for manufacturing membranes suitable for use in "reverse osmosis" water purification from cellulosic film-forming materials involve the steps of, (a) preparing a "dope" of the cellulosic dissolved in a solvent mixture comprising acetic acid and acetone,
(b) casting the dope in the form of a film,
(c) carefully removing the solvents from the film, and
(d) tempering the film.

The addition to the dope of a small amount of a soluble amine salt of a strong inorganic acid (such as pyridine sulfate, for example) or a soluble quaternary ammonium compound (such as tetraethyl-ammonium iodide, for example) results in the formation of membranes having unusually high flux and unusually high salt rejection properties.

---

This invention relates to compositions useful in the manufacture of membranes adapted to separate solutes from solution and to processes for the preparation of such membranes.

Membranes for use particularly in so-called "reverse osmosis" processes for removing dissolved salts from contaminated or "hard" water have been developed only recently. Such membranes are made by special processes whereby a special "skin" or layer of selectively effective (for preventing the passage of the unwanted dissolved salts through the membrane while simultaneously permitting such passage of purified water) porosity is formed at the surface of the membrane. It is apparently the presence of the special "skin" that endows these membranes with their valuable selective nature. In turn, the valuable selective nature of useful membranes is apparently dependent upon one or more critical processing details such as, (1) the particular solvents used in the process (see U.S. Pat. 3,344,214), (2) the presence or absence of certain inorganic salts in the solvent system and how they are incorporated into the system (see U.S. Pats. 3,133,132 and 3,133,137), (3) the particular way the membranes are "developed" from dopes containing the essential materials (see the above patents and South African Pat. 670,799/67), and (4) even the particular treatment the resulting membranes receive after they are "developed."

In general, processes for manufacturing useful "reverse osmosis" membranes involve the steps of,
 (a) Preparing a solution of (1) one or more suitable film forming polymeric materials, and usually
(2) one or more special "pore-producing" salts dissolved in a substantially organic solvent system, (b) Casting the dope in the form of a film;
(c) Evaporating a portion of the organic solvents from the resulting cast solution (to thereby cause the solution to set up in the basic form of the membrane);
(d) Subjecting the resulting membrane to a treatment with liquid water (usually immersion); and
(e) Sometimes subjecting the washed membrane to a special heat treatment. It is known, for example, that only certain polymeric film forming materials such as cellulosic esters and ethers can be used successfully for this purpose. Also, only certain organic solvents are useful, and only a limited number of materials can function as "pore-producing" materials. As a matter of fact, to date, the number of useful solvent systems and useful "pore-producing" materials that have been disclosed is extremely limited. For example, useful "pore-producing" materials that have been discovered and disclosed heretofore are essentially inorganic in nature, having only certain specified anions (such as, for example, perchlorate, iodide, bromide, salicylate, triphenyl boron, chlorate, tetraiodomercurate, thiocyanate, and fluosilicate). Moreover, almost every process involving the use of these conventional "pore-producing" materials results in the manufacture of membranes that are unduly limited in either the rate of flow of purified water therethrough or the degree of purification (of the water) that can be obtained by passing the water through such membranes in conventional "reverse osmosis" equipment. In addition, no common property has been found to exist in the effective pore-producing materials known to date that can be used to predict the effectiveness of untried materials.

It has now been discovered that, surprisingly, certain members of the class of materials known as organic amine salts (of strong inorganic acids) and certain quaternary ammonium compounds have the peculiar ability to function as effective "pore-producing" materials. Typical, non-limiting, examples of such effective organic amine salts include pyridine sulfate, triethylamine sulfate, triethanolamine sulfate, diethanolamine sulfate, the picoline sulfates, the lutidine sulfates, N,N-dimethylaniline sulfate, 2-aminoethanol sulfate and triethanolamine phosphate. Other organic amine sulfate, phosphate, hydrochloride and nitrate salts are also effective pore-producing materials. However, certain other organic amine salts are apparently not "effective pore-producing materials" (such as pyridine hydrochloride, for example, or N,N-dimethyloctyl-amine sulfate, or even 1,6-hexanediamine sulfate), and there is no known ready way to predict in advance whether a given material will be optimally "effective" in this context. The only known common properties among the "effective pore-producing" amine salts of the present invention are, (a) The "effective pore-producing" amine salts are salts of strong acids;
(b) They are soluble in water at 34° F. to the extent of at least about 0.005 weight percent; and
(c) They are soluble in the preferred solvent system of the present invention (acetone and acetic acid in a weight ratio respectively of from about 20:80 to about 80:20), at 25° C., to the extent of at least about 0.05 weight percent.

While the "effective pore-producing" organic amine salts of this invention can be used in combination with any of the conventional effective film forming materials, optimum results can be obtained when the film forming material is a soluble cellulosic ester, ether (or combination ester-ether) having a degree of substitution of from about 1.5 to 3. Of these, preferred for use are the cellulose acetates. Still further preferred are those cellulose acetates containing from about 38 to about 41 weight percent acetyl. Similarly, the "effective pore-producing" organic amine salts of this invention can be used most effectively in solvent systems that consist essentially of either acetic acid, per se, or a blend of acetic acid and acetone. Particularly preferred organic solvent systems are those that consist essentially of acetic acid and acetone in a weight ratio; respectively of from about 40:60 to about 70:30.

The particular manner in which the effective pore-producing amine salts of this invention are introduced into the dopes (from which the effective membranes are cast)

is not critical, insofar as the successful practice of the invention is concerned. For example, they can be simply intermixed with the remaining ingredients until they dissolve in the dope. They can also be pre-dissolved either in the organic solvent system (or a portion thereof), or in water, or in any other convenient solvent, and subsequently used in the dissolved state to formulate the dope. They can also be introduced into the dope or in the solvent system separately; that is, by first introducing either the amine or the strong acid into the solvent fraction and subsequently introducing the other component of the desired amine salt (in the amount to theoretically yield the desired ratio of strong acid to amine). Other means for introduction of the desired amine salts into the dopes can also be used.

It is also noteworthy, that, for optimum results in the practice of the present invention, the molar ratio of organic amine to strong acid anion in the effective pore-producing salts should be about 2:1, whenever the strong acid anion is multivalent (as for example $H_2SO_4$ and $H_3PO_4$).

In the following examples, all "parts" are by weight unless otherwise specified.

EXAMPLES 1–10

Into 950 parts of a 50:50 (by volume) mixture of acetone and acetic acid are dissolved 250 parts of a commercial grade of cellulose acetate, containing 39.3% acetyl, 3.7% hydroxyl, and having an intrinsic viscosity (acetone) of 1.26, and also 25 parts of pyridine sulfate. This mixture is blended until a smooth, clear solution is formed. This formulation is then coated at about 30° C. onto a moving belt of biaxially oriented poly(ethylene terephthalate) and smoothed to an original thickness of from 3 to 10 mils. The resulting coatings are then exposed to dry air at about 30° C. for varying lengths of time followed by a 5 minute wash with cold (34° F.) water. Then the films are stripped from the polyester support and washed overnight in 30° C. water.

Subsequently, the wet films are tempered for 4 minutes at varying temperatures, and finally subjected to a standard "reverse osmosis" membrane test in which each membrane is subjected to 600 p.s.i. pressure directed through a solution of 5000 p.p.m. NaCl (pH=7) against one surface of the membrane (the surface that was exposed to the air during the initial drying step). The water passing through the membrane is measured and analyzed for its salt content to determine the "flux" (rate of flow of water therethrough) and the "salt rejection" properties of the membranes. (See U.S. Pat. 3,342,728.)

Data resulting from such tests are recorded in Table I, below.

TABLE I

| Example Number | Air Exposed Time (sec.) | Tempering Temp., °F. | Wet Film Thickness (inches) | Flux, Gal./Ft.²/Day | Salt Conc. in Product (p.p.m.) | Percent Salt Rejection |
|---|---|---|---|---|---|---|
| 1 | 30 | 170 | .007 | 33.5 | 280 | 94.4 |
| 2 | 60 | 160 | .007 | 48 | 540 | 89.3 |
| 3 | 60 | 165 | .005 | 38 | 325 | 93.5 |
| 4 | 60 | 170 | .005 | 30 | 190 | 96.2 |
| 5 | 90 | 160 | .005 | 37.5 | 450 | 91.0 |
| 6 | 90 | 165 | .005 | 30 | 310 | 93.8 |
| 7 | 90 | 170 | .005 | 23 | 200 | 96.0 |
| 8 | 120 | 160 | .003 | 33.5 | 710 | 85.8 |
| 9 | 120 | 165 | .003 | 26 | 435 | 91.3 |
| 10 | 120 | 170 | .003 | 19.5 | 22 | 95.6 |

EXAMPLES 11–24

(Amine sulfates)

Procedures like those of Examples 1–10, above, are follower, except that the following dope formulation is used for each experiment.

Dope formulation:
  100 grams cellulose acetate,
  330 grams solvent (60:40 by weight acetic acid:acetone)
  0.025 mole of amine salt (2:1=amine:acid in 12 g. HOAc)

Also, the saline feed solution in these examples initially contains 5500 p.p.m. of salt. Pertinent data illustrating several tests using several varieties of amine salts are shown in Table II, below. A 90 second air drying step is utilized in each instance.

TABLE II.—EVALUATION OF AMINE SALTS

| Example Number | Amine Salt | Tempering Temp. (°F.) | Flux at 600 p.s.i. (gal./ft.²/day) | Salt in Product (p.p.m.) |
|---|---|---|---|---|
| | | None | 64 | 4,300 |
| 11 | Pyridine sulfate | 165 | 33 | 480 |
| | | 170 | 28 | 300 |
| | | 175 | 26 | 260 |
| 12 | Triethylamine sulfate | 165 | 32 | 280 |
| | | 170 | 22 | 220 |
| | | 175 | 17 | 200 |
| 13 | Triethanolamine sulfate | 165 | 52 | 850 |
| | | 170 | 48 | 780 |
| | | 175 | 34 | 480 |
| 14 | Trimethylamine sulfate | None | 56 | 4,900 |
| | | 165 | 20 | 370 |
| | | 170 | 14 | 280 |
| | | 175 | 12 | 220 |
| 15 | Alpha-picoline sulfate | 165 | 13 | 220 |
| | | 170 | 10.5 | 140 |
| | | 175 | 7 | 120 |
| 16 | Beta-picoline sulfate | 165 | 17 | 300 |
| | | 170 | 17 | 230 |
| | | 175 | 8 | 200 |
| 17 | 2,6-lutidine sulfate | 165 | 24 | 480 |
| | | 170 | 18.5 | 180 |
| | | 175 | 13 | 170 |
| 18 | 2,4-lutidine sulfate | 165 | 13.5 | 300 |
| | | 170 | 11 | 170 |
| | | 175 | 10 | 150 |
| 19 | N,N-dimethylaniline sulfate | 165 | 6 | 240 |
| 20 | N,N-dimethyloctylamine sulfate | 175 | <1 | |
| 21 | Diethanolamine sulfate | None | 78 | 3,500 |
| | | 165 | 27 | 350 |
| | | 175 | 20 | 130 |
| 22 | 2-aminoethanol sulfate | 175 | 3.5 | 200 |
| 23 | 1,6-hexanediamine [1] | | | |
| 24 | Aniline sulfate [1] | | | |

[1] Amine salt is insoluble in the dope.

EXAMPLES 25-28

(Amine phosphates)

Following the manipulative techniques set out in the discussion of Examples 1-10 above, the following formulation is utilized to prepare membranes.

Dope formulation:
  100 grams cellulose acetate (#E398-10)
  330 grams solvent )60:40=acetic acid:acetone)
  20 grams amine salt solution (containing 0.1 mole amine salt in 50 grams of acetic acid)

The resulting membranes are tested at 600 p.s.i. pressure against water containing 5500 p.p.m. of NaCl. Data resulting from such tests are recorded in Table III, below.

TABLE III.—SALT REJECTION—PHOSPHATE SALTS

| Ex. No. | Amine Salt | Tempering Temp. (° F.) | Flux | Salt in Product |
|---|---|---|---|---|
| 25 | Pyridine (1 mole/mole of $H_3PO_4$). | None<br>165 | 12.5<br>3 | 2,050<br>260 |
| 26 | Pyridine (2 moles/mole of $H_3PO_4$). | None<br>165 | 15.5<br>4.5 | 2,550<br>230 |
| 27 | Triethanolamine (1 mole/mole $H_3PO_4$). | None<br>165 | 27<br>12 | 3,050<br>390 |
| 28 | Triethanolamine (2 moles/mole $H_3PO_4$). | 165<br>170<br>175 | 21<br>17.5<br>17 | 460<br>240<br>180 |

EXAMPLE 29

The procedure of Examples 1-10 is followed, except that a quaternary ammonium halide (tetraethyl ammonium bromide) is used instead of the pyridine sulfate. Salt rejection tests on the resulting membranes yield excellent data, such as those in Table IV.

TABLE IV

| Tempering Temp. (° F.) | Flux at 600 p.s.i. | Salt in Product (p.p.m.) |
|---|---|---|
| None | 78 | 4,800 |
| 165 | 72 | 3,900 |
| 175 | 28.5 | 700 |
| 180 | 22 | 240 |
| 190 | 5.5 | 90 |

Apparently ony of those quaternary ammonium halide compounds that are soluble in the dope system to the extent of at least about 0.2 weight percent can be utilized in the successful practice of this invention. Typical, nonlimiting examples of these include tetraethylammonium bromide, tetraethylammonium iodide, diethyldimethylammonium bromide, and ethyldibutylmethylammonium iodide. Generally, such useful quaternary ammonium compounds are bromides or iodides having the structure:

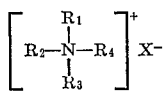

wherein $R_1$, $R_2$, $R_3$ and $R_4$ are alkyl groups and the total number of carbon atoms (in $R_1$, $R_2$, $R_3$ plus $R_4$) is at most about 24 (preferably at most about 12), and X is a halide (preferably Br or I).

It is interesting to note that, whereas apparently membranes of some utility can be made so long as there is at least about 0.01 mole of one or more of the effective pore producing materials of this invention per 100 grams of cellulosic film-former in the dope composition from which the membrane is cast, optimum results can be obtained only if at least about 0.03 mole of such materials/100 grams cellulosic film-former are present therein. Too much "pore-producing material," however, is difficult to obtain, since levels as high as 0.20 mole/100 grams cellulosic film-former, or even higher levels, can be used successfully to produce effective desalination membranes.

Similarly, in the overall practice of this invention, the dopes from which the valuable membranes described above are cast can contain the cellulosic film-forming material in a wide range of concentrations. However, it is generally preferred that the cellulosic/solvent weight ratio in the dope compositions of the present invention be within the range of from about 1:3 to about 1:4.

Although utility as membranes for the purification of brackish or sea water via "reverse osmosis" processes has been set out hereinbefore as a preferred use for the valuable membranes made in accordance with the present invention, these membranes can be used in many ways, including, for example, the concentration of fruit juices, selective purification of urine (in artifical kidneys).

This invention has been described in detail with particular reference to preferred embodiments thereof, but it will be understood that variations and modifications can be effected within the spirit and scope of the invention as described hereinabove and a defined in the appended claims.

I claim:

1. In a process for manufacturing a membrane suitable for use in reverse osmosis processes for purifying salty water, which process comprises (a) preparing a concentrated dope consisting essentially of a blend of organic solvents, at least one cellulose ester and a water soluble pore producing material, (b) casting in the form of a film said concentrated dope, (c) evaporating a portion of the solvent in said concentrated dope from the resulting cast film, and (d) subsequently immersing the partially dried film into water to thereby remove at least the greatest part of said pore producing material from said film; the improvement which comprises preparing said concentrated dope by intermixing said cellulose ester, a pore producing amine salt, acetic acid and acetone; the weight ratio of said acetic acid to said acetone in said concentrated dope being between about 20:80 and about 80:20 the amount of said cellulose ester in said concentrated dope being at least about 10 weight percent, the amount of said pore producing amine salt in said concentrated dope being at least about 0.01 weight percent, and said pore producing amine salt being selected from the group consisting of pore producing hydrohalide, nitrate, sulfate, and phosphate salts of organic amines and pore producing quaternary ammonium halide compounds; said pore producing amine salt also being soluble in water at 34° F. to the extent of at least about 0.005 weight percent and in said concentrated dope to the extent of at least about 0.2 weight percent.

2. An improved process as in claim 1, wherein said cellulose ester is cellulose acetate, the combined weight of said acetic acid and said acetone is equal to at least about 65 weight percent of said concentrated dope, and the ratio of said acetic acid to said acetone is from about 40:60 to about 70:30, respectively.

3. An improved process as in claim 2, wherein said pore producing amine salt is an amine sulfate.

4. An improved process as in claim 3, wherein the molar ratio of said amine to said sulfate in said amine sulfate is 2:1, respectively.

5. An improved process as in claim 4, wherein said amine sulfate is pyridine sulfate.

6. An improved process as in claim 4, wherein said amine sulfate is triethylamine sulfate.

7. An improved process as in claim 4, wherein said amine sulfate is triethanolamine sulfate.

9. An improved process as in claim 4, wherein said amine sulfate is N,N-dimethylaniline sulfate.

10. An improved process as in claim 4, wherein said amine sulfate is 2-aminoethanol sulfate.

11. An improved process as in claim 4, wherein said amine sulfate is selected from the group consisting of picoline sulfates and lutidine sulfates.

12. An improved process as in claim 2, wherein said pore producing amine salt is an amine phosphate.

13. An improved process as in claim 12, wherein said amine phosphate is triethanolamine phosphate.

14. An improved process as in claim 13, wherein the molar ratio of triethanolamine to phosphate in said triethanolamine phosphate is 2:1, respectively.

15. An improved process as in claim 2, wherein said pore producing amine salt is a quaternary ammonium compound.

16. An improved process as in claim 15, wherein said quaternary ammonium compound is tetraethylammonium bromide.

17. An improved process as in claim 15, wherein said quaternary ammonium compound is tetraethylammonium iodide.

18. An improved process as in claim 15, wherein said quaternary ammonium halide compound is diethyldimethylammonium bromide.

19. A concentrated homogeneous dope solution comprising,
(a) an organic solvent portion consisting essentially of acetic acid and acetone;
(b) at least about 20 weight percent of a membrane forming cellulose ester; and
(c) at least about 0.5 weight percent of a pore producing organic amine salt selected from the group consisting of pore producing hydrohalide, nitrate, sulfate and phosphate salts of organic amines and pore producing quaternary ammonium halide compounds;
said dope solution being capable of forming a membrane, after it is cast in the form of a film, partially dried, washed with water and cured, that can selectively pass purified water and selectively exclude salt from passage when it is subjected to reverse osmotic pressure.

20. A concentrated dope solution as in claim 19, wherein said membrane forming cellulose ester is cellulose acetate containing from about 38 to about 41 weight percent acetyl and said pore producing organic amine salt is selected from the group consisting of pore producing amine sulfates, amine phosphates, amine hydrochlorides, amine nitrates, and quaternary ammonium halide compounds.

21. A concentrated dope solution as in claim 20, wherein said pore producing organic amine salt is pore producing amine sulfate.

22. A concentrated dope solution as in claim 21, wherein the molar ratio of amine to sulfate in said pore producing amine sulfate is 2:1, respectively.

23. A concentrated dope solution as in claim 22, wherein said pore producing amine sulfate is selected from the group consisting of pyridine sulfate, triethylamine sulfate, triethanolamine sulfate, diethanolamine sulfate, N,N-dimethylaniline sulfate, 2-aminoethanol sulfate, picoline sulfates and lutidine sulfates.

24. A concentrated dope solution as in claim 20, wherein said pore producing organic amine salt is a pore producing amine phosphate.

25. A concentrated dope solution as in claim 20, wherein said pore producing organic amine salt is a pore producing quaternary ammonium halide compound.

26. A concentrated dope solution as in claim 20, wherein said pore producing organic amine salt is a pore producing amine hydrochloride.

27. A concentrated dope solution as in claim 20, wherein said pore producing organic amine salt is a pore producing amine nitrate.

References Cited

UNITED STATES PATENTS

| | | | |
|---|---|---|---|
| 3,285,765 | 11/1966 | Cannon | 264—49 XR |
| 3,331,772 | 7/1967 | Brownscombe et al. | |
| 3,364,288 | 1/1968 | Loeb | 264—217 XR |
| 3,432,584 | 3/1969 | Cannon et al. | 264—41 XR |

FOREIGN PATENTS 964,514   7/1964   Great Britain.

OTHER REFERENCES

Peakin, F. H.: "The Sulfates of Pyridine," in Journal of the Society of the Chemical Industry, vol. 59, 56–7 (1940).

Lloyd, A. G. et al.: "Infrared Studies of Sulfate Esters, III. O-Sulfate Esters of Alcohols, Amino Alcohols and Hydroxylated Amino Acids," Biochemica et Biophysica Acta., 52 (1961), 413–419.

PHILIP E. ANDERSON, Primary Examiner

U.S. Cl. X.R.

106—186, 196; 210—500; 264—217

PO-1050
(5/69)

UNITED STATES PATENT OFFICE
CERTIFICATE OF CORRECTION

Patent No. 3,522,335                    Dated  July 28, 1970

Inventor(s)  Martin E. Rowley

It is certified that error appears in the above-identified patent and that said Letters Patent are hereby corrected as shown below:

In Table I, 5th column, line 10 delete "22" and substitute therfor---220---.

In column 4, line 34 delete "lower" and substitute therefor---lowed---.

In Table II (opposite 13) delete "Triethanolamiue" and substitute therefor---Triethanolamine---.

In column 5, line 44 delete "ony" and substitute therefor---any---.

In column 6, after line 64 insert Claim Number 8 as follows---
In the Claims:

8. An improved process as in claim 4, wherein said amine sulfate is diethanolamine sulfate.

(SEAL)
Attest:

Edward M. Fletcher, Jr.
Attesting Officer

WILLIAM E. SCHUYLER, JR.
Commissioner of Patents